US011584365B2

(12) United States Patent
Staudacher et al.

(10) Patent No.: US 11,584,365 B2
(45) Date of Patent: Feb. 21, 2023

(54) METHOD FOR SELECTING AND ACCELERATED EXECUTION OF REACTIVE ACTIONS

(71) Applicant: Robert Bosch GmbH, Stuttgart (DE)

(72) Inventors: Elmar Staudacher, Esslingen (DE); Udo Schulz, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 557 days.

(21) Appl. No.: 16/599,861

(22) Filed: Oct. 11, 2019

(65) Prior Publication Data

US 2020/0148202 A1    May 14, 2020

(30) Foreign Application Priority Data

Nov. 13, 2018  (DE) .......................... 102018219376.2

(51) Int. Cl.
*B60W 30/09* (2012.01)
*B60W 10/18* (2012.01)
*B60W 10/20* (2006.01)
*B60W 10/30* (2006.01)

(52) U.S. Cl.
CPC ............ *B60W 30/09* (2013.01); *B60W 10/18* (2013.01); *B60W 10/20* (2013.01); *B60W 10/30* (2013.01); *B60W 2400/00* (2013.01); *B60W 2710/18* (2013.01); *B60W 2710/20* (2013.01); *B60W 2710/30* (2013.01)

(58) Field of Classification Search
None
See application file for complete search history.

(56) References Cited

U.S. PATENT DOCUMENTS

| 2019/0027036 A1* | 1/2019 | Mishina ............ G08G 1/096844 |
| 2019/0225349 A1* | 7/2019 | Sinusas .................... H02J 4/00 |
| 2019/0232955 A1* | 8/2019 | Grimm .................. B60W 50/14 |

FOREIGN PATENT DOCUMENTS

| DE | 19845568 A1 | 10/1999 |
| DE | 102013224508 | 6/2015 |
| DE | 102014014307 A1 | 3/2016 |
| DE | 102015201272 A1 | 7/2016 |
| DE | 102015215676 A1 | 2/2017 |
| DE | 102015225082 A1 | 6/2017 |
| DE | 102016209902 A1 | 12/2017 |
| DE | 102016212195 A1 | 1/2018 |
| DE | 102016212915 A1 | 1/2018 |
| WO | 2017079349 A1 | 5/2017 |

\* cited by examiner

*Primary Examiner* — Navid Z. Mehdizadeh
(74) *Attorney, Agent, or Firm* — Norton Rose Fulbright US LLP; Gerard Messina

(57) ABSTRACT

A method for selecting and executing at least one reactive action of a vehicle includes a control unit receiving sensor data from a vehicle sensor system; detecting an emergency situation based on the sensor data; performing an evaluation; and selecting and implementing a reactive action for minimizing an accident risk of the vehicle based on the evaluation, where, in the evaluation, sensors that are uninvolved in the detection of the emergency situation are not taken into account or are taken into account at a lower weighting, are operated at a reduced performance, and/or are operated with a reduced scanning range. In addition, a control unit, computer program, and machine-readable memory medium can be provided for implementing the method.

10 Claims, 2 Drawing Sheets

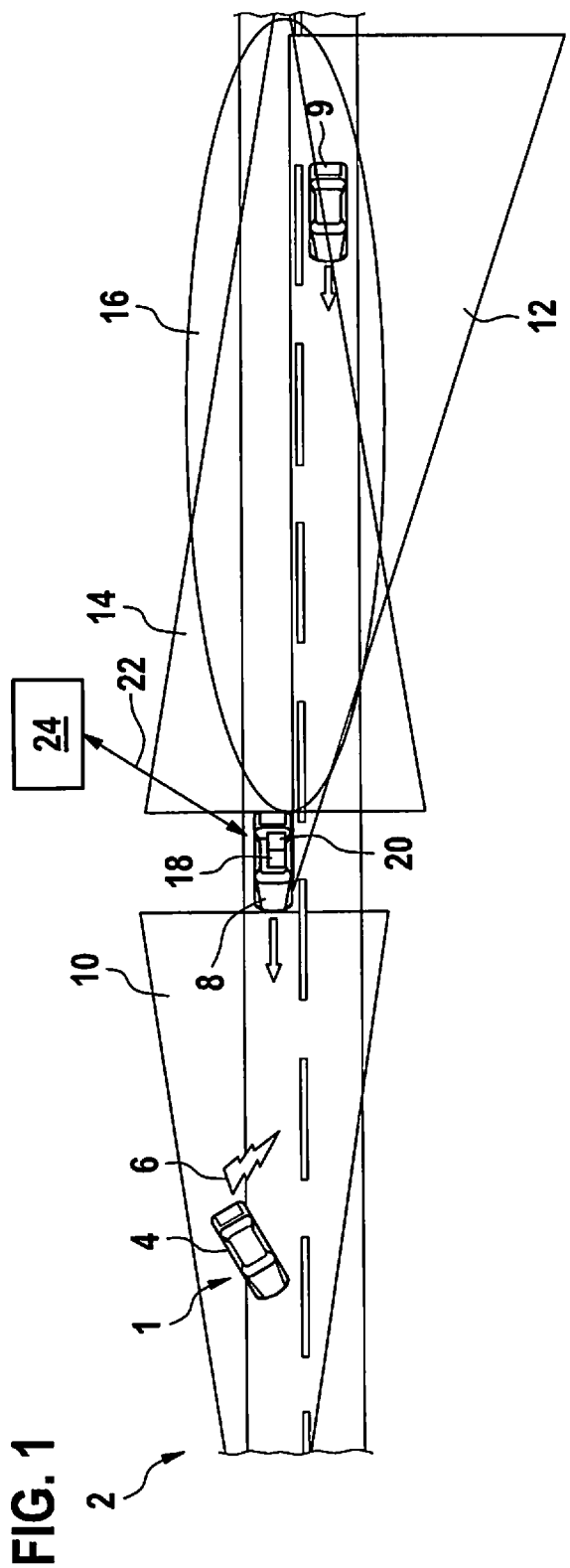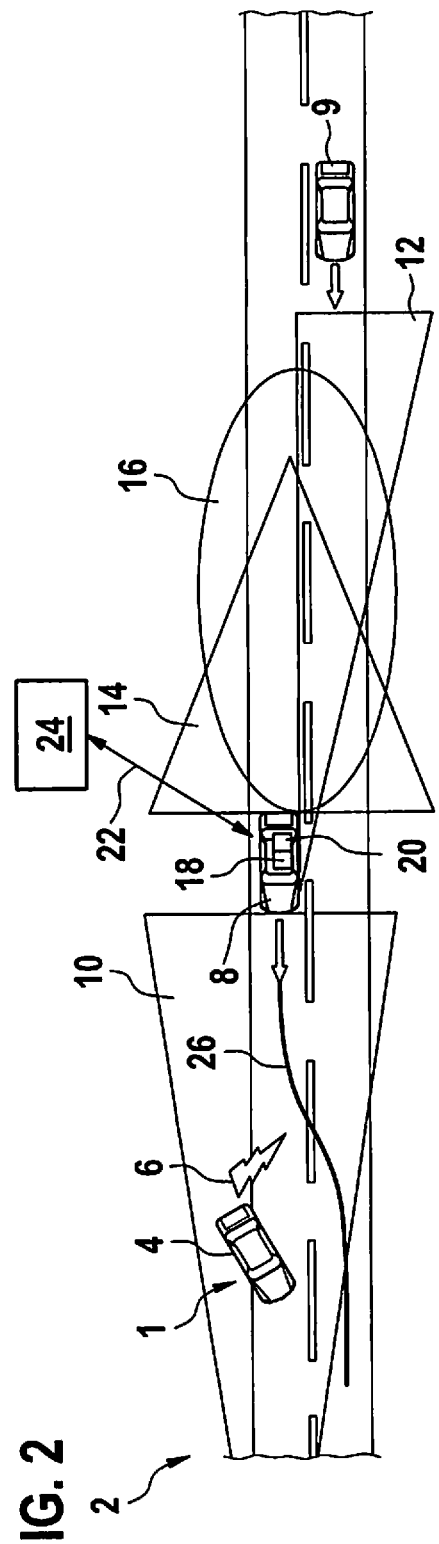

METHOD FOR SELECTING AND ACCELERATED EXECUTION OF REACTIVE ACTIONS

CROSS-REFERENCE TO RELATED APPLICATIONS

The present application claims priority under 35 U.S.C. § 119 to DE 10 2018 219 376.2 filed in the Federal Republic of Germany on Nov. 13, 2018, the content of which is hereby incorporated by reference herein in its entirety.

FIELD OF THE INVENTION

The present invention relates to a method for selecting and executing at least one reactive action of a vehicle by a control unit. In addition, the present invention relates to a control unit, a computer program, as well as a machine-readable memory medium.

BACKGROUND

The mobility sector is currently in transition. In addition to an increase in the use of electrically driven vehicles, automated driving is a relevant topic of future mobility.

In the field of automated driving, the so-called SAE levels are known, which define the degree of automation. Using a level 0 to a level 5, it is defined whether a vehicle has no automation or is fully automated.

The vehicles currently produced in series generally have an automation degree of level 1 or 2. These are normally vehicles equipped with assistance systems where it is predominantly the driver who controls the vehicle. The first vehicles having an automation degree according to level 3 are known as well.

In a vehicle automated according to level 3, the driver is able to delegate the responsibility to the vehicle for a certain period of time. In the automation according to level 4 or 5, some vehicle scenarios do not even require a driver any longer. The vehicle must thus be traveling with a driver fallback level.

The current vehicle systems use different input parameters and utilize the various data sources for carrying out a data fusion in an effort to obtain precise and reliable knowledge of the vehicle environment. As a rule, the known methods for performing the data fusion cover requirements for assisted driving functions up to an automation degree of level 3. It is still the human who is responsible or serves as a fallback level. As soon as a human is no longer available, the system must be able to react in a different manner.

From WO 2017/079349 A1, systems, devices, and methods are known for implementing an active safety system in an autonomous vehicle. The autonomous vehicle can move along a trajectory through an environment outside the autonomous vehicle. The environment can include one or more object(s) which could possibly collide with the autonomous vehicle. The autonomous vehicle can employ a sensor system in an effort to acquire the environment in order to detect objects, and it is able to take measures to decrease or avoid a potential collision with the autonomous vehicle. Further related art is known from DE 10 2013 224 508 A1.

In emergency situations, measures in the form of braking maneuvers are usually carried out in order to avert a potential collision. However, in particular on roads where the average speed is high such as highways or superhighways, a stationary vehicle or a vehicle braking heavily can raise the accident risk.

SUMMARY

An objective on which the present invention is based can be seen as providing a method for reducing an accident risk despite an accelerated reaction to emergency situations.

According to an example embodiment of the present invention, a method for selecting and carrying out at least one reactive action of a vehicle by a control unit includes a control unit receiving and analyzing sensor data from a vehicle sensor system connected to the control unit; and the control unit detecting an emergency situation based on the sensor data. The sensors that are uninvolved in the detection of the emergency situation are not taken into account in an evaluation by the control unit, are taken into account with a lower weighting, are operated at a reduced performance, and/or are operated with a reduced scanning range. The method further includes at least one reactive action being selected by the control unit in order to minimize an accident risk of the vehicle. Based on the sensor data used for the evaluation, the vehicle carries out the at least one selected reactive action.

According to an example embodiment of the present invention, a control unit is provided for a connection to at least one sensor and for evaluating sensor data from the at least one sensor, the control unit being developed to carry out all steps of the described method.

According to an example embodiment of the present invention, a computer program includes instructions that, when the computer program is executed by a computer or a control unit, induce it to carry out the described method.

According to an example embodiment of the present invention, a machine-readable memory medium stores the computer program.

Using the method according to the present invention, it is possible to carry out a detection of emergency situations and to arrive at the subsequent decision as to whether to carry out a full braking operation or whether there is a chance of averting the emergency situation through an evasive maneuver. The method according to the present invention in particular turns away from static processing of the information from a sensor data fusion in an autonomous vehicle, towards a dynamic and more humanized adaptation of the evaluation of the sensor data.

For example, camera sensors, LIDAR sensors, radar sensors, mirror-replacement systems, ultrasonic sensors, and the like can be used as sensors. For example, the vehicle can be a vehicle that is able to be automated according to an SAE J13016 level that is higher than or equal to 3.

The sensors that are not involved in detecting the emergency situation can particularly be sensors that have not detected a corresponding situation or have detected it only partially. In addition, faulty, impaired, or misaligned sensors can be placed in this group of sensors. These "uninvolved" sensors can preferably be operated at a reduced performance and/or using a reduced scanning range. For instance, these sensors can be used for monitoring a vehicle environment. Due to the reduced performance, it is possible to operate the sensors at a shorter range or a lower scanning rate. This makes it possible to accelerate the reaction capability of automatable vehicles. Such a method can be used in particular in vehicles that are equipped according to an automatization level that is greater than level 3 and thus are able to be operated without a driver.

By minimizing an accident risk of the vehicle, especially the risk of being involved in an accident with an object or vehicle or a road user which triggers the emergency situation is able to be reduced. A possible scenario can be a collision of the vehicle with an object or a vehicle that is located on a road in an uncontrolled or unsecured manner. Alternatively, a risk of an accident can be increased when a full braking operation or an evasive maneuver is performed by the vehicle, in which case the accident risk can be of a different magnitude depending on the situation. The present method makes it possible to estimate the accident risk and to select a reactive action that poses the relatively lowest risk to the vehicle.

The present invention can in particular be used in order to avoid emergency braking within the framework of what is known as an emergency lane change. In this context, the present method can include the following features, for instance:

detecting an emergency situation and deciding whether full braking is required or an evasive maneuver will be initiated;

narrowing the detection range of the environment sensor system;

defining the most advantageous sensor or sensors and possibly a restriction to the use of this sensor;

automatically activating the hazard light system during an emergency lane change; and signaling a modified trajectory and an impending collision.

Using the method, a humanized system behavior in extreme emergency situations based on the emergency lane change is able to be replicated despite the absence of a driver. An emergency situation can preferably not be managed by a full braking operation but by an evasive maneuver. The longitudinal dynamics (braking) can therefore be maintained, if possible, in order to keep the traffic flowing. This is ensured by avoiding emergency braking operations inasmuch as a stationary vehicle on the road always poses a greater risk than an evasive maneuver.

If an emergency situation is identified, then a detection range of the environment sensor system that is not used for detecting the emergency situation, such as radar, USS, a rear view camera, and the like, is able to be narrowed. In the process, all sensor and computing resources can particularly be employed to increase the detection probabilities and to keep them at the highest possible level in case of damaged sensors (during the damage scenario) as a result of redundancies. For example, the fields of view of sensors featuring detected persons can be reduced and the persons monitored further, which is known as tracking. The sensors or the environment sensor system is/are preferably part of the vehicle sensor system of the vehicle.

Using the method according to the present invention, an emergency situation is able to be detected by one or a plurality of sensor(s). All other sensors that do not play a role or are not involved in the detection and which scan the rest of the environment of the vehicles, are able to be reduced in their relevance or weighting. This makes it possible to accelerate reactions to the emergency situation by concentrating the computing capacities on the corresponding "involved" sensors while maintaining the safety standard. Since the sensors that are not involved in the handling of the emergency situation are operated at a reduced capacity or with a reduced scanning area by the control unit, evasive maneuvers can be permitted even if an adjacent vehicle is forced to react to the evasive maneuver because the uninvolved sensors have detected it later or only to a limited extent. As a result of this "disadvantage" of the environment sensor system not involved in the emergency situation, the focus for the decision-making ability of the control unit can be placed on the sensors that play a role in the handling of the emergency situation.

According to an example embodiment, the reactive actions are stored in a memory unit of the control unit, the control unit carrying out an evasive maneuver, a braking maneuver, or a warning as a reactive action. The possible reactive actions can be stored in the control unit in the form of instruction patterns, which allows for a fast reaction after a selection has been made. The reactive actions can preferably be carried out using a minimum number of sensor data.

According to an example embodiment, at least one sensor involved in detecting the emergency situation is a sensor of the vehicle sensor system and detects the emergency situation or a trigger of the emergency situation. The sensors involved in detecting the emergency situation are preferably also responsible for tracking the emergency situation. For example, the emergency situation can be caused by a broken-down or damaged vehicle, an unsecured object on the road, damage to the road and the like. The method according to the present invention is able to selectively focus the resources on the vehicle sensors involved in detecting the emergency situation. All other sensors can be operated at a reduced performance or with a reduced scanning range. The scanning range can be defined by a spatial scanning angle or field of view and/or by a range.

According to a further example embodiment, the sensors of the vehicle sensors that are relevant for the evaluation are selected or considered in a weighted manner as a function of the situation or the road. For example, based on the driving situation, e.g., highway, superhighway, or the like, it can be defined which sensor signal is given attention or priority during the evaluation. In the process, vehicle sensors can be provided with weightings in a sensor data fusion and given preference in the evaluation by the control unit, for instance. If different results are transmitted, e.g., if an object is detected by one sensor but not by another sensor, then the sensor with the best suitability for this situation can be given priority in the evaluation. This can be explicitly implemented in road traffic only because of the emergency situation. Here, it is assumed that the vehicles in back and/or the vehicles in front are also able to avert a danger in this emergency situation and to react to the behavior of the, for instance, evading vehicle in a risk-optimized manner.

According to an example embodiment, in a warning as a reactive action, the control unit activates a flashing-light system, a hazard warning light system, an acoustic warning system, or an electronic warning via a Car-2-X communications link. For example, in an emergency lane change, a hazard warning light system can be automatically activated in order to warn the possible nearby road users and to prompt them to actively cooperate in this emergency situation. In addition, in a calculated prediction of a trajectory that can lead to minimized damage, for instance, or in a path that the vehicle will follow in the future, corresponding signaling or an advance notification is able to be generated by the control unit. This signaling or advance notification can be transmitted to the nearby road users through acoustic, visual, or electronic warnings. For example, via Car-2-Car communications links, the drivers of nearby vehicles can be directly made aware of a planned evasive maneuver. If an accident is unavoidable, then the future collision partner can indicate, e.g., by a blinker and/or headlight flasher, that the vehicle is coming its way and/or will collide with it.

According to an example embodiment, in a detected emergency situation, the control unit operates the sensors of the vehicle sensor system not involved in the detection of the emergency situation at a lower performance or with a restricted scanning range. For example, what is known as the field of view (FOV) of the sensors can be restricted in a sensor-based or hardware-based manner. Furthermore, from the sensor data, a portion of the sensor data that corresponds to the restricted scanning range can be used for the further evaluation. Such a reduction of the data quantity allows the control unit to initiate an accelerated evaluation and thus a faster reaction to the danger.

As a result, a concentration of the evaluation on a defined subrange of the scanning range of the sensors that focuses on the risk environment can take place. The selected subrange can preferably be trained or selected by the control unit as a function of the situation.

According to an example embodiment, the control unit is a vehicle-internal or vehicle-external control unit and is connected in a wire-conducted or wireless manner via a communications unit to the vehicle sensor system. A control unit is thereby able to read out and evaluate the vehicle sensor system, either internally from the vehicle or indirectly via a communications link. As a result, the evaluation of the sensor data is able to be carried out in a particularly flexible manner.

Preferred example embodiments of the present invention are described in greater detail in the following text using heavily simplified schematic illustrations.

BRIEF DESCRIPTION OF THE DRAWING

FIG. 1 a schematic plan view of an emergency situation in order to illustrate a method according to a first example embodiment.

FIG. 2 a schematic plan view of an emergency situation in order to illustrate a method according to a second example embodiment.

DETAILED DESCRIPTION

Figure 3:
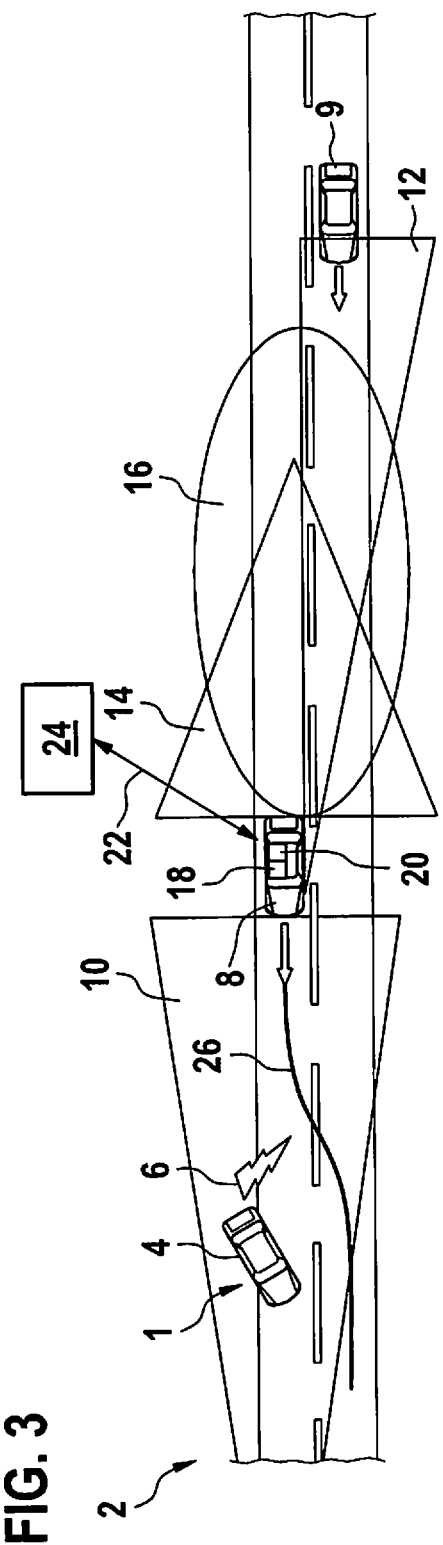
FIG. 3 a schematic plan view of an emergency situation in order to illustrate a method according to a third example embodiment.

FIG. 1 shows a schematic plan view of an emergency situation 1 in order to illustrate a method according to a first example embodiment. Illustrated system 2 has a damaged vehicle 4, which warns road users via an activated hazard warning light system 6. A nearby vehicle 8 drives toward damaged vehicle 4 and detects emergency situation 1 using a vehicle sensor system 10, 12, 14, 16. A sensor 10, which is developed as what is known as a long-range radar, takes part in the detection of damaged and unsecured vehicle 4. Remaining vehicle sensor system 12, 14, 16 does not contribute to the detection of vehicle 4.

Vehicle 8, for example, can be developed as a passenger car that is able to be autonomously operated according to an SAE level ≥3.

Further sensors 12, 14, 16, for instance, can be a camera-based mirror-replacement system 12, a further long-range radar 14, and a mid-range radar 16. According to the example embodiment, sensors 12, 14, 16 are environment sensors which monitor a side and rear environment of vehicle 8. The positions of sensors 10, 12, 14, 16 are examples and can also be placed in different locations on vehicle 8. For illustration purposes and for the sake of clarity, only the scanning ranges of the respective sensors 10, 12, 14, 16 are schematically illustrated.

Sensors 10, 12, 14, 16 are coupled with a control unit 18. This allows control unit 18 to evaluate the sensor data from sensors 10, 12, 14, 16 and to control vehicle 8. Control unit 18 is connected to a machine-readable memory medium 20. Machine-readable memory medium 20 has a computer program that includes instructions which, when the computer program is executed by control unit 18, induce it to execute a method according to the present invention.

In addition, control unit 18 is developed to establish a communications link 22 to an external server unit 24 and to exchange data with it. External server unit 24 can be developed as a vehicle-external control unit and generate control instructions for vehicle 8 based on the sensor data transmitted via communications link 22. In addition, server unit 24 is able to be used to notify and warn other road users 9.

Because of the emergency situation, vehicle 8 would carry out full braking operation. Such a reaction is not safe and cannot rule out occurrence of an accident. According to the example embodiment, the employed vehicle sensor system 10, 12, 14, 16 directed toward the rear of vehicle 8 would report that a vehicle 9 is approaching and would not allow an automated evasion.

FIG. 2 shows a schematic plan view of an emergency situation 1 in order to illustrate a method according to a second example embodiment. A serious danger situation is detected by vehicle 8 and an attempt is made to keep the longitudinal dynamics of the traffic flow unchanged.

Employed sensor system 12, 14, 16 directed toward the back operates with a reduced field of view. This is achieved by a lower performance of sensors 12, 14, 16. Because of the lower performance, higher dynamics and a better utilization of the computing capacity of control unit 18 are able to be realized. This allows vehicle 8 to react to emergency situation 1 in a more rapid manner.

According to the example embodiment, it is detected that no vehicle 9 is located in the adapted scanning range of sensors 12, 14, 16. A release to execute an emergency lane change can therefore be granted and an evasive maneuver 26 be carried out by vehicle 8 as a reactive action.

Because of the method according to the present invention, evasive maneuver 26 is able to performed despite the fact that nearby vehicle 9 is otherwise too close to measuring vehicle 8. A release would usually not be granted based on the sensor data of environmental sensors 12, 14, 16. Because of the restrictions of uninvolved environment sensors 12, 14, 16, control unit 18 is able to reduce their relevance in its decision finding.

FIG. 3 shows a schematic plan view of an emergency situation 1 in order to illustrate a method according to a third example embodiment. In contrast to the already described example embodiments, instead of a reduced performance and the related lower range, a spatial scanning angle of sensors 12, 14, 16 is reduced. This reduces the so-called field of view of sensors 12, 14, 16.

Because of the new field of view, higher dynamics with an improved utilization of the computing power are able to be implemented, and a correspondingly faster possible reaction by control unit 18 is achievable.

According to the example embodiment, it is detected that a vehicle 9 in the adapted field of view is identified only by mirror-replacement camera 12. The two other technologies or sensors 14, 16, on the other hand, do not report a vehicle 9. Nevertheless, due to the adapted data fusion, control unit 18 is still able to initiate lane change 26 in an emergency.

Figure 4:
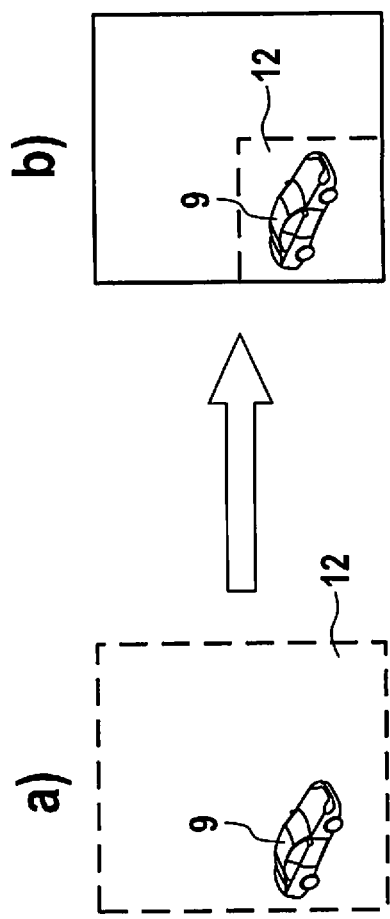
FIG. 4 a schematic scanning range of a sensor, which is restricted by a method according to an example embodiment of the present invention.

FIG. 4 shows a schematic scanning range of sensor 12, which is developed as a mirror-replacement camera, the present method restricting the scanning range in terms of its scanning angle. Part a) of FIG. 4 shows a complete scanning angle. In part b) of FIG. 4, a restricted scanning range is illustrated by the dashed line. Due to the lower quantity of sensor data of the restricted scanning range, the data quantity able to be evaluated can be reduced and the evaluation by control unit 18 accelerated. More specifically, a faster object detection is able to be carried out.

What is claimed is:

1. A method of operation of a vehicle that uses a vehicle sensor system that includes a plurality of sensors, the method comprising:
   based on sensor data provided from a subset of the plurality of sensors of the vehicle sensor system, which sensor system is connected to a processor, the processor identifying presence of an emergency situation; and
   in response to the identification of the presence of the emergency situation:
      the processor determining that one or more of the plurality of sensors were not included in the subset and were uninvolved in the identification of the emergency situation;
      based on the determination, the processor modifying the vehicle sensor system into a modified state by reducing respective weightings assigned to the one or more of the plurality of sensors with respect to consideration of their respective portions of further output sensor data of the vehicle sensor system, reducing respective scanning ranges of the one or more of the plurality of sensors for producing their respective portions of the further output sensor data, and/or reducing respective power of the one or more of the plurality of sensors for producing their respective portions of the further output sensor data;
      the processor obtaining the further output sensor data from the vehicle sensor system in the modified state;
      the processor evaluating the further output sensor data to select a reactive action for minimizing an accident risk of the vehicle in the emergency situation; and
      the vehicle performing an evasive driving and/or braking maneuver under control of the processor according to the selected reactive action.

2. The method of claim 1, wherein the reactive action is stored in a memory of the processor.

3. The method of claim 1, wherein the modifying is performed by the reduction of the respective weightings.

4. The method of claim 1, further comprising, in response to the identification of the presence of the emergency situation, outputting a warning by activating a flashing light system, a hazard light system, an acoustic warning system, or an electronic warning via a Car-2-X communications link.

5. The method of claim 1, wherein the modifying is performed by the reduction of the respective power of the one or more of the plurality of sensors.

6. The method of claim 1, wherein the modifying is performed by the reduction of the respective scanning ranges of the one or more of the plurality of sensors.

7. A control unit for operating a vehicle, the control unit comprising:
   a processor connected to a vehicle sensor system of the vehicle, wherein the vehicle sensor system includes a plurality of sensors, and the processor is configured to:
      based on sensor data provided from a subset of the plurality of sensors of the vehicle sensor system, identify presence of an emergency situation; and
      in response to the identification of the presence of the emergency situation:
         determine that one or more of the plurality of sensors were not included in the subset and were uninvolved in the identification of the emergency situation;
         based on the determination, the modify the vehicle sensor system into a modified state by reducing respective weightings assigned to the one or more of the plurality of sensors with respect to consideration of their respective portions of further output sensor data of the vehicle sensor system, reducing respective scanning ranges of the one or more of the plurality of sensors for producing their respective portions of the further output sensor data, and/or reducing respective power of the one or more of the plurality of sensors for producing their respective portions of the further output sensor data;
         obtain the further output sensor data from the vehicle sensor system in the modified state;
         evaluate the further output sensor data to select a reactive action for minimizing an accident risk of the vehicle in the emergency situation; and
         control the vehicle, according to the selected reactive action, to perform an evasive driving and/or braking maneuver.

8. The control unit of claim 7, wherein processor is a vehicle-internal or vehicle-external control unit that is connected to the sensor system in a wire-conducted or wireless manner via a communications unit.

9. A non-transitory computer-readable medium on which are stored instructions that are executable by a processor and that, when executed by the processor, cause the processor to perform a method for operating a vehicle that uses a vehicle sensor system that is connected to the processor and that includes a plurality of sensors, the method comprising:
   based on sensor data provided from a subset of the plurality of sensors of the vehicle sensor system, identifying presence of an emergency situation; and
   in response to the identification of the presence of the emergency situation:
      determining that one or more of the plurality of sensors were not included in the subset and were uninvolved in the identification of the emergency situation;
      based on the determination, modifying the vehicle sensor system into a modified state by reducing respective weightings assigned to the one or more of the plurality of sensors with respect to consideration of their respective portions of further output sensor data of the vehicle sensor system, reducing respective scanning ranges of the one or more of the plurality of sensors for producing their respective portions of the further output sensor data, and/or reducing respective power of the one or more of the plurality of sensors for producing their respective portions of the further output sensor data;
      obtaining the further output sensor data from the vehicle sensor system in the modified state;
      evaluating the further output sensor data to select a reactive action for minimizing an accident risk of the vehicle in the emergency situation; and
      control the vehicle, according to the selected reactive action, to perform an evasive driving and/or braking maneuver.

10. A method of operation of a vehicle that uses a vehicle sensor system that includes a plurality of sensors, wherein the plurality of sensors include at least one first sensor configured to detect a region in front of the vehicle and at least one second sensor configured to detect a regions behind the vehicle, the method comprising:
- based on sensor data provided from the at least one first sensor, which sensor system is connected to a processor, the processor identifying presence of an object in front of the vehicle causing an emergency situation; and
- in response to the identification:
  - the processor determining that the at least one second sensor was uninvolved in the identification;
  - based on the determination, the processor modifying the vehicle sensor system into a modified state by reducing respective weightings assigned to the at least one second compared to respective weightings assigned to the at least one first sensor with respect to consideration of their respective portions of further output sensor data of the vehicle sensor system, reducing respective scanning ranges of the at least one second sensor for producing their respective portions of the further output sensor data, and/or reducing respective power of the at least one second sensor for producing their respective portions of the further output sensor data;
  - the processor obtaining the further output sensor data from the vehicle sensor system in the modified state;
  - the processor evaluating the further output sensor data to select one of a plurality of reactive actions for minimizing an accident risk of the vehicle in the emergency situation, the evaluation including determining, for each of the plurality of reactive actions and based on the respective portions of the further output sensor data of the at least one second sensor, whether objects are present behind the vehicle that are expected to impact the respective reactive action; and
  - the vehicle performing an evasive driving and/or braking maneuver under control of the processor according to the selected reactive action.

* * * * *